United States Patent
Moon et al.

(10) Patent No.: US 10,930,918 B2
(45) Date of Patent: Feb. 23, 2021

(54) SECONDARY BATTERY

(71) Applicant: Samsung SDI Co., Ltd., Yongin-si (KR)

(72) Inventors: Sehwan Moon, Yongin-si (KR); Sangeun Cheon, Yongin-si (KR); Sangwoo Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 284 days.

(21) Appl. No.: 15/335,253

(22) Filed: Oct. 26, 2016

(65) Prior Publication Data
US 2017/0194621 A1 Jul. 6, 2017

(30) Foreign Application Priority Data
Jan. 4, 2016 (KR) .................. 10-2016-0000510

(51) Int. Cl.
| | | |
|---|---|---|
| *H01M 2/04* | (2006.01) | |
| *H01M 2/34* | (2006.01) | |
| *H01M 10/02* | (2006.01) | |
| *H01M 10/04* | (2006.01) | |
| *H01M 2/36* | (2006.01) | |
| *H01M 2/12* | (2006.01) | |

(52) U.S. Cl.
CPC .............. *H01M 2/36* (2013.01); *H01M 2/04* (2013.01); *H01M 2/1264* (2013.01); *H01M 2/345* (2013.01); *H01M 10/02* (2013.01); *H01M 10/0431* (2013.01)

(58) Field of Classification Search
CPC .... H01M 2/36; H01M 10/0431; H01M 10/02; H01M 2/04; H01M 2/345; H01M 2/1264
See application file for complete search history.

(56) References Cited

U.S. PATENT DOCUMENTS

| | | | | |
|---|---|---|---|---|
| 6,083,640 A | * | 7/2000 | Lee ...................... | H01M 2/0277 429/161 |
| 2010/0055555 A1 | | 3/2010 | Fukase et al. | |
| 2010/0190062 A1 | * | 7/2010 | Yamamoto ............ | H01M 4/134 429/231.95 |
| 2011/0305929 A1 | * | 12/2011 | Byun .................... | H01M 2/345 429/61 |
| 2012/0189884 A1 | * | 7/2012 | Guen ................... | H01M 2/0473 429/82 |
| 2013/0164567 A1 | * | 6/2013 | Olsson ................ | H01M 10/488 429/7 |
| 2015/0064550 A1 | * | 3/2015 | Kawasaki ............. | H01M 2/365 429/185 |
| 2015/0357670 A1 | * | 12/2015 | Yamafuku ......... | H01M 10/0431 429/56 |

FOREIGN PATENT DOCUMENTS

| | | |
|---|---|---|
| JP | 2000-243415 A | 9/2000 |
| JP | 2010-061815 A | 3/2010 |
| KR | 10-2013-0012407 | 2/2013 |

* cited by examiner

*Primary Examiner* — Lisa S Park
(74) *Attorney, Agent, or Firm* — Lewis Roca Rothgerber Christie LLP (57) ABSTRACT

A secondary battery includes an electrode assembly; a case accommodating the electrode assembly; a cap plate sealing the case; an injection opening in the cap plate; and an exhaustion opening in the cap plate and being spaced from the injection opening.

5 Claims, 5 Drawing Sheets

SECONDARY BATTERY

CROSS-REFERENCE TO RELATED APPLICATION

This application claims priority to and the benefit of Korean Patent Application No. 10-2016-0000510 filed on Jan. 4, 2016 in the Korean Intellectual Property Office, the entire contents of which are herein incorporated by reference.

BACKGROUND

1. Field

The present invention relates to a secondary battery.

2. Description of the Related Art

Unlike a primary battery, rechargeable secondary batteries can be repeatedly charged and discharged. A low capacity secondary battery that comprises a pack shaped battery cell may be used as a power source for various small portable electronic devices, such as cellular phones or camcorders. A high capacity secondary battery that has several tens of battery cells connected to one another packaged in the form of a pack may be used as power sources for driving motors such as a hybrid automobile or the like.

SUMMARY

Embodiments of the present invention provide a secondary battery, which can increase an electrolyte injection speed.

Embodiments of the present invention also provide a secondary battery, which can suppress a protective device from being damaged when an electrolyte is injected.

The above and other aspects of the present invention will be described in or be apparent from the following description of exemplary embodiments.

According to an aspect of the present invention, there is provided a secondary battery including an electrode assembly, a case accommodating the electrode assembly and having a top opening, a cap plate sealing the top opening of the case, an injection opening formed to extend through the cap plate, and an exhaustion opening spaced from the injection opening and formed to extend through the cap plate.

The injection opening may have a size larger than or equal to that of the exhaustion opening.

The electrode assembly may be formed by winding a negative electrode plate, a positive electrode plate and a separator together and includes a winding axis.

The winding axis of the electrode assembly may be perpendicular to a direction in which the injection opening and the exhaustion opening extend through the cap plate.

The winding axis of the electrode assembly may be parallel to a direction in which the injection opening and the exhaustion opening extend through the cap plate.

The exhaustion opening may have a membrane formed therein.

Only a gas-phase material may pass through the membrane.

The cap plate may have an inversion plate formed therein, and when the internal pressure of the case exceeds a first pressure, the inversion plate may be deformed to generate a short-circuit current.

When an electrolyte is injected into the case through the injection opening, a second pressure may be generated in the case and the second pressure is lower than the first pressure.

According to another aspect of the present invention, there is provided a secondary battery including an electrode assembly, a case accommodating the electrode assembly and having a top opening, a cap plate sealing the top opening of the case, an injection opening formed to extend through the cap plate, and an exhaustion opening formed to extend through the case.

The injection opening may have a size larger than or equal to that of the exhaustion opening.

The electrode assembly may be formed by winding a negative electrode plate, a positive electrode plate and a separator together and includes a winding axis.

Directions in which the exhaustion opening extend through the case and the injection opening extend through the cap plate may be parallel with each other.

The winding axis of the electrode assembly may be parallel to a direction in which the injection opening extend through the cap plate and the exhaustion opening extend through the case.

The exhaustion opening may have a membrane formed therein.

Only a gas-phase material may pass through the membrane.

As described above, the secondary battery according to an embodiment of the present invention can increase an electrolyte injection speed.

In addition, the secondary battery according to an embodiment of the present invention can suppress a protective device from being damaged when an electrolyte is injected.

BRIEF DESCRIPTION OF THE DRAWINGS

The above and other features of the present invention will become more apparent by describing in detail exemplary embodiments thereof with reference to the attached drawings in which.

DETAILED DESCRIPTION

Hereinafter, examples of embodiments of the invention will be described in detail with reference to the accompanying drawings such that they can easily be made and used by those skilled in the art.

As used herein, the term "and/or" includes any and all combinations of one or more of the associated listed items. In addition, the terminology used herein is for the purpose of describing particular embodiments only and is not intended to be limiting thereof. As used herein, the singular forms are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various members, elements, regions, layers and/or sections, these members, elements, regions, layers and/or sections should not be limited by these terms. These terms are only used to distinguish one member, element, region, layer, and/or section from another.

Figure 1:
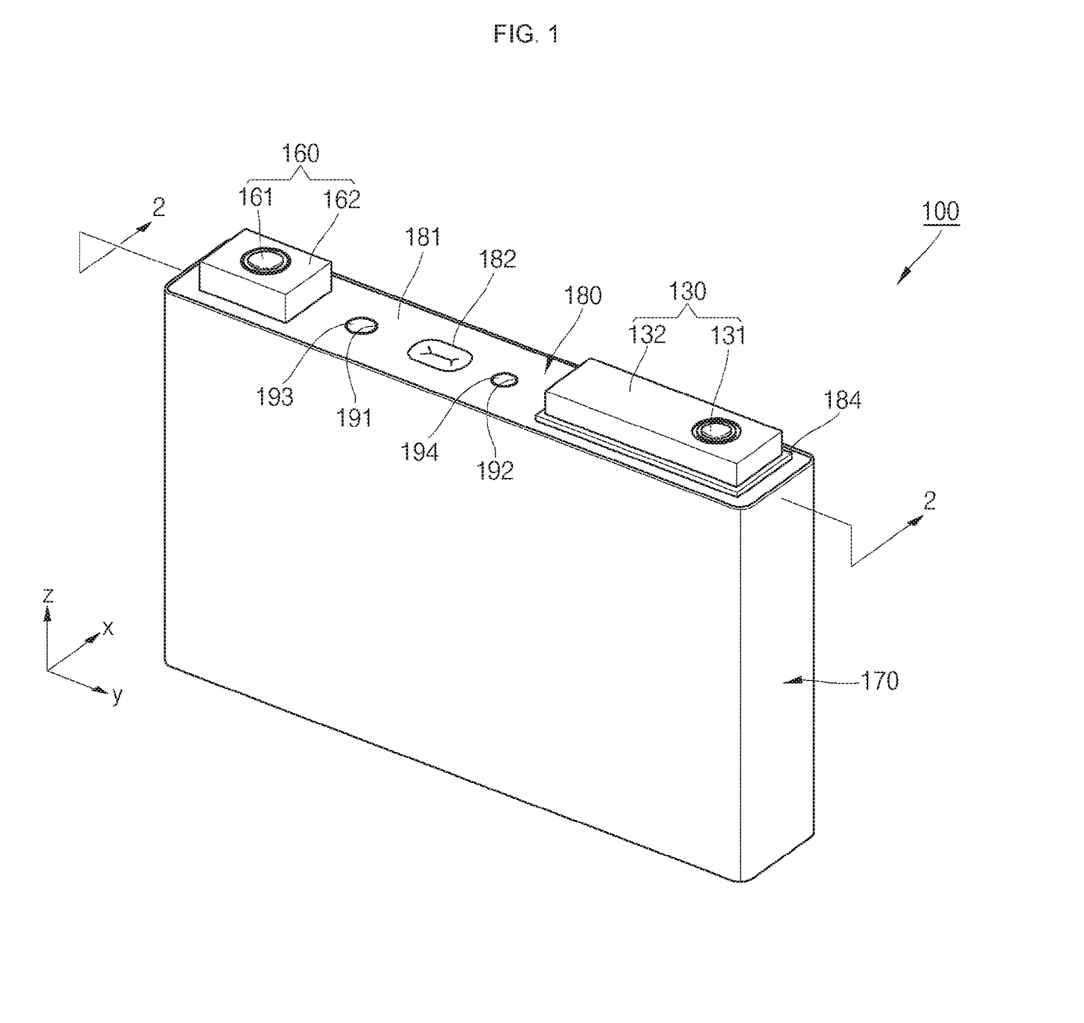
FIG. 1 is a perspective view of a secondary battery according to an embodiment of the present invention.
Figure 2:
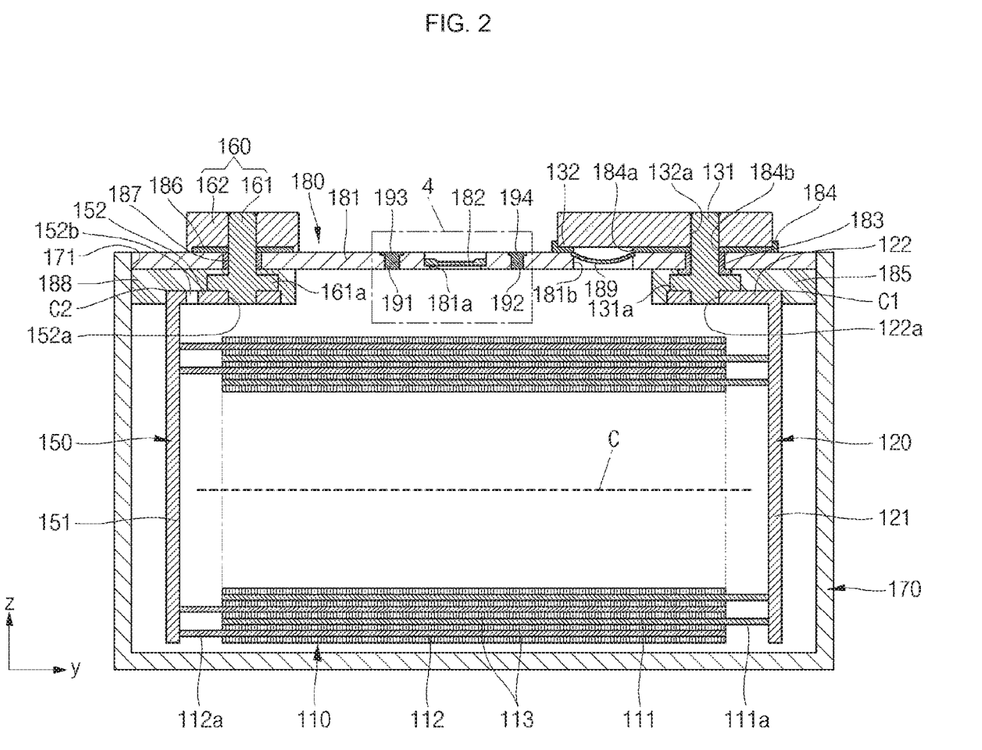
FIG. 2 is a cross-sectional view taken along the line 2-2 of FIG. 1.
Figure 3:
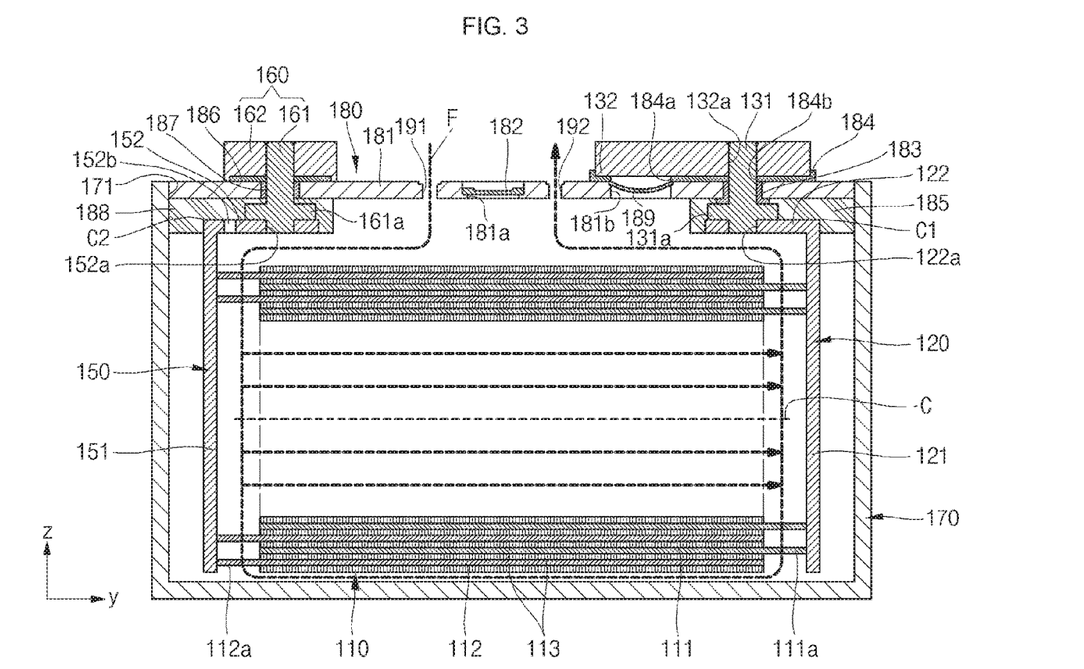
FIG. 3 is a cross-sectional view illustrating an electrolyte injection path in the secondary battery illustrated in FIG. 1.
Figure 4:
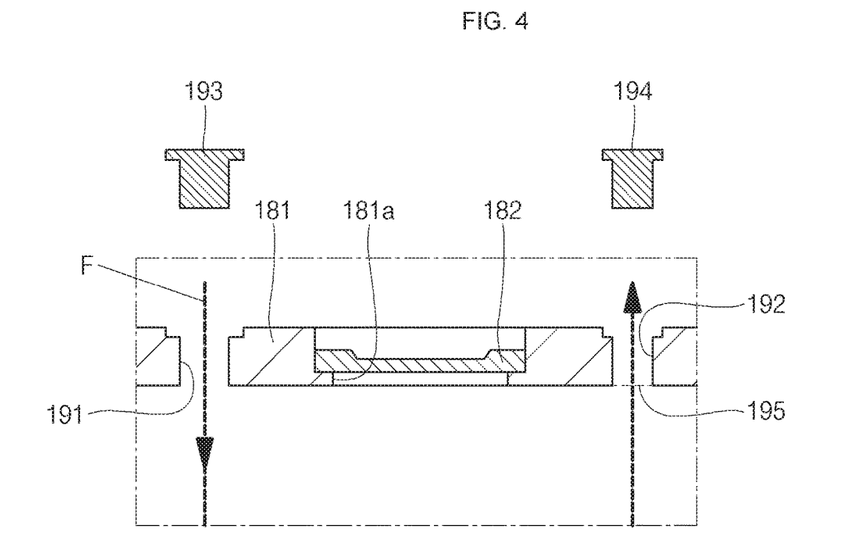
FIG. 4 is an enlarged view illustrating a portion 4 of FIG. 2.

FIG. 1 is a perspective view of a secondary battery according to an embodiment of the present invention, FIG. 2 is a cross-sectional view taken along the line 2-2 of FIG. 1, FIG. 3 is a cross-sectional view illustrating an electrolyte injection path in the secondary battery illustrated in FIG. 1, and FIG. 4 is an enlarged view illustrating a portion 4 of FIG. 2.

Referring first to FIGS. 1 and 2, the secondary battery 100 according to an embodiment of the present invention includes an electrode assembly 110, a first collector plate 120, a first terminal portion 130, a second collector plate 150, a second terminal portion 160, a case 170, a cap assembly 180, an injection opening 191 and an exhaustion opening 192. A plurality of secondary batteries 100 are connected in series to each other to construct a large capacity battery pack that outputs a high voltage.

The electrode assembly 110 may be formed by winding together or stacking together a stack of a first electrode plate 111, a separator 113 and a second electrode plate 112, which may be formed of thin plates or layers. The first electrode plate 111 may function as a negative electrode and the second electrode plate 112 may function as a positive electrode.

The first electrode plate 111 may include a negative electrode active material layer coated on both surfaces of a negative electrode collector formed of a metal foil made of, for example, copper (Cu) or nickel (Ni). A carbon based material, Si, Sn, tin oxide, composite tin alloys, transition metal oxide, lithium metal nitride or lithium metal oxide may be used as a negative electrode active material of the negative electrode active material layer, but the present invention is not limited to the materials of the negative electrode active material disclosed herein. In addition, the first electrode plate 111 may include a first electrode uncoated region 111a that is a region not coated with the negative electrode active material layer.

The first electrode uncoated region 111a may become a path of flow of current between the first electrode plate 111 and the outside of the first electrode plate 111. However, the present invention is not limited to the materials of the first electrode plate 111 disclosed herein.

The second electrode plate 112 may include a positive electrode active material layer coated on both surfaces of a positive electrode collector formed of a highly conductive metal foil made of, for example, aluminum (Al). A chalcogenide compound may be used as a positive electrode active material of the positive electrode active material layer, and examples thereof may include composite metal oxides, such as LiCoO2, LiMn2O4, LiNiO2, LiNi1-xCoxO2 (0<x<1), or LiMnO2. However, the present invention is not limited to the materials of the second electrode plate 112 disclosed herein. In addition, the second electrode plate 112 may include a second electrode uncoated region 112a that is a region not coated with the positive electrode active material layer.

The second electrode uncoated region 112a may become a path of flow of current between the second electrode plate 112 and the outside of the second electrode plate 112. However, the present invention is not limited to the materials of the second electrode plate 112 disclosed herein.

The first electrode plate 111 and the second electrode plate 112 may have different polarities. In other words, the first electrode plate 111 may function as a positive electrode and the second electrode plate 112 may function as a negative electrode.

The separator 113 may prevent a short-circuit between the first electrode plate 111 and the second electrode plate 112 and may allow movement of lithium ions. In addition, the separator 113 may be formed of one selected from the group consisting of polyethylene (PE), polypropylene (PP), or a copolymer of PE and PP. However, the present invention is not limited to the materials of the separator 113 disclosed herein. In order to prevent the short-circuit between the first electrode plate 111 and the second electrode plate 112, the separator 113 is formed to have a larger width than the first electrode plate 111 and the second electrode plate 112.

The first collector plate 120 and the second collector plate 150 are coupled to opposite ends of the electrode assembly 110 to be electrically connected to the first electrode plate 111 and the second electrode plate 112, respectively. In one embodiment, the first collector plate 120 and the second collector plate 150 are coupled to the first electrode uncoated region 111a and the second electrode uncoated region 112a, corresponding to the opposite ends of the electrode assembly 110, respectively.

The electrode assembly 110 may be accommodated or retained in the case 170 with an electrolyte. The electrolyte may include an organic solvent such as ethylene carbonate (EC), propylene carbonate (PC), diethyl carbonate (DEC), ethyl methyl carbonate (EMC) or dimethyl carbonate (DMC), and a lithium salt such as LiPF6 or LiBF4. In addition, the electrolyte may be a liquid, solid, and/or gel electrolyte.

The first collector plate 120 may be made of a conductive material, such as aluminum, copper, a copper alloy or equivalents thereof.

The first collector plate 120 contacts the first electrode uncoated region 111a protruding to one end of the electrode assembly 110 to be electrically connected to the first electrode plate 111. The first collector plate 120 includes a first electrode connecting portion 121 connected to the first electrode plate 111 and a first terminal connecting portion 122 connected to the first terminal portion 130. The first collector plate 120 may be formed as a single body. The first collector plate 120 having a corner C1 corresponding to a bent portion between the first electrode connecting portion 121 and the first terminal connecting portion 122 may be formed in a substantially inverted 'L' shape.

The first electrode connecting portion 121 contacts the first electrode uncoated region 111a protruding to one end of the electrode assembly 110 to be electrically connected to the first electrode plate 111.

The first electrode connecting portion 121 is welded to the first electrode uncoated region 111a to be shaped to stand in a vertical direction.

The first terminal connecting portion 122 is welded to the first terminal portion 130 and is shaped of a plate lying in a substantially horizontal direction to then be installed between a cap plate 181 of the cap assembly 180 to be described later and the electrode assembly 110. A first fastening opening 122a is formed in the first terminal connecting portion 122 to extend through top and bottom surfaces of the first terminal connecting portion 122. A lower region of the first electrode terminal 131 of the first terminal portion 130 is fitted into the first fastening opening 122a to then be coupled. In other words, the first fastening opening 122a may be sized to correspond to the lower region of the first electrode terminal 131 to accommodate the lower region of the first electrode terminal 131.

The first terminal portion 130 includes a first electrode terminal 131 and a first connection plate 132.

The first electrode terminal 131 passes through the cap plate 181 to protrude therefrom and is electrically connected to the first collector plate 120 under the cap plate 181. The first electrode terminal 131 may have a flange 131a configured to prevent the first electrode terminal 131 from being dislodged from the cap plate 181. A region of the first electrode terminal 131, which is formed under the flange 131a, may be fitted into the first fastening opening 122a of the first collector plate 120 to then be riveted or welded thereto. In addition, a region of the first electrode terminal 131, which is formed above the flange 131a, may pass through the cap plate 181 to protrude therefrom, and the first connection plate 132 may be fixed to the extending and protruding region.

The first connection plate 132 is spaced from the cap plate 181 by a first upper insulation member 184 to be described later and oriented parallel to the cap plate 181.

The first connection plate 132 may be generally made of a conductive metal or equivalents thereof, and may be electrically connected to the first electrode terminal 131.

A first terminal opening 132a is formed in the first connection plate 132 to extend through an upper region of the first electrode terminal 131. An upper region of the first electrode terminal 131 of the first terminal portion 130 is fitted into the first terminal opening 132a. In one embodiment, the first terminal opening 132a may be sized to correspond to the upper region of the first electrode terminal 131 to accommodate the upper region of the first electrode terminal 131.

The first terminal opening 132a is larger than the first electrode terminal 131 and an extension part 184b of the first upper insulation member 184 to be described later is inserted between the first electrode terminal 131 and the first terminal opening 132a.

The second collector plate 150 includes a second electrode connecting portion 151 connected to the second electrode plate 112 and a second terminal connecting portion 152 connected to the second terminal portion 160. The second collector plate 150 is formed as a single body. The second collector plate 150 having a corner C2 corresponding to a bent portion between the second electrode connecting portion 151 and the second terminal connecting portion 152 may be formed in a substantially inverted shape. The second collector plate 150 may be made of a conductive metal selected from the group consisting of aluminum, an aluminum alloy or equivalents thereof.

The second electrode connecting portion 151 contacts the second electrode uncoated region 112a protruding to one end of the electrode assembly 110 to be electrically connected to the second electrode plate 112. The second electrode connecting portion 151 is welded to the second electrode uncoated region 112a to be shaped to stand in a vertical direction.

The second terminal connecting portion 152 is welded to the second terminal portion 160 and is a plate located between the cap plate 181 and the electrode assembly 110. A second fastening opening 152a and a fuse opening 152b are formed in the second terminal connecting portion 152 to extend through top and bottom surfaces of the second terminal connecting portion 152. A second electrode terminal 161 of the second terminal portion 160 is fitted into the second fastening opening 152a to then be coupled thereto. In other words, the second fastening opening 152a may be sized to correspond to the second electrode terminal 161 to accommodate the second electrode terminal 161.

The fuse opening 152b is positioned at a region of the second terminal connecting portion 152, which is adjacent to the corner C2 so as not to overlap the second fastening opening 152a coupled to the second electrode terminal 161. The region where the fuse opening 152b is positioned has a sectional area smaller than other portions of the second terminal connecting portion 152 due to the fuse opening 152b.

Therefore, the region where the fuse opening 152b is positioned is configured to be melted by high heat generated when the current of 3000 A or higher instantaneously flows through the secondary battery 100 due to a high-current short circuit, thereby functioning as a fuse for cutting off the flow of current.

The high-current short circuit may be caused when an inversion plate 189 of the cap assembly 180 to be described later and the first connection plate 132 are brought into contact with each other due to the heat generated by overcharge of the secondary battery 100 or decomposition of an electrolyte to increase the internal pressure of the secondary battery 100. In addition, the high-current short circuit may also be caused when the second terminal portion 160 and the other side of the first connection plate 132 are brought into contact with each other due to Y-axis compression of the secondary battery 100. Moreover, the high-current short circuit may also be caused when the cap plate 181 and a bottom surface of the first connection plate 132 are brought into direct contact with each other by Z-axis compression of the secondary battery 100. In other words, when the high-current short circuit is caused in the region where the fuse opening 152b is formed, the region where the fuse opening 152b is melted to cut off the flow of electricity. Therefore, before a danger of fire or explosion results, charging or discharging operations of the secondary battery 100 can be interrupted.

The second terminal portion 160 is generally made of a metal or equivalents thereof and is electrically connected to the second collector plate 150. In addition, the second terminal portion 160 is electrically connected to the cap plate 181. The second terminal portion 160 includes a second electrode terminal 161 accommodated in the second fastening opening 152a of the second collector plate 150 and a second terminal plate 162 coupled to the second electrode terminal 161.

The second electrode terminal 161 passes through the cap plate 181 to protrude therefrom and is electrically connected to the second collector plate 150 under the cap plate 181. The second electrode terminal 161 may have a flange 161a laterally extending to prevent the second electrode terminal 161 from being dislodged from the cap plate 181. A region of the second electrode terminal 161, which is formed under the flange 161a, may be fitted into the second fastening opening 152a of the second collector plate 150 to then be riveted or welded thereto. In addition, a region of the second electrode terminal 161, which is formed above the flange 161a, may pass through the cap plate 181 to protrude therefrom, and the second terminal plate 162 may be fixed to the extending and protruding region.

The second terminal plate 162 is shaped of a plate having a second terminal opening 162a passing through top and bottom surfaces of the second terminal plate 162. The second terminal opening 162a of the second terminal plate 162 may be sized and shaped to correspond to the second electrode terminal 161 in a horizontal direction to accommodate the second electrode terminal 161. The second electrode terminal 161 protruding to an upper portion of the cap plate 181 is fitted into the second terminal opening 162a of the second terminal plate 162 to then be riveted or welded thereto.

The second terminal portion 160 may be made of, for example, one selected from the group consisting of aluminum, an aluminum alloy and equivalents thereof, but the present invention is not limited to the materials of the second terminal portion 160 disclosed herein.

The case 170 is made of a conductive metal, such as aluminum, an aluminum alloy or nickel plated steel. In addition, the case 170 may be formed in a substantially hexahedral shape and may have a top opening 171 through which the electrode assembly 110, the first collector plate 120 and the second collector plate 150 are inserted and placed. As will be appreciated, the top opening 171 is a substantially opened portion of the periphery of the cap assembly 180. In one embodiment, the interior surface of the case 170 may be insulated, so that the case 170 is insulated from the electrode assembly 110, the first collector plate 120, the second collector plate 150 and the cap assembly 180.

The cap assembly 180 is coupled to the case 170. In detail, the cap assembly 180 includes the cap plate 181, a safety vent 182, seal gaskets 183 and 187, upper insulation members 184 and 186, lower insulation members 185 and 188 and the inversion plate 189.

The cap plate 181 seals the top opening 171 of the case 170 and may be made of the same material as the case 170. For example, the cap plate 181 may be coupled to the case 170 by laser welding. The cap plate 181 may be electrically connected to the second terminal portion 160, and the cap plate 181 and the second terminal portion 160 may have the same polarity. Accordingly, the cap plate 181 and the case 170 may also have the same polarity. The cap plate 181 includes a vent opening 181a and a short-circuit opening 181b formed to extend through top and bottom surfaces of the cap plate 181. In one embodiment, the short-circuit opening 181b is positioned under the first connection plate 132.

The safety vent 182 is installed in the vent opening 181a of the cap plate 181 and may have a notch configured to be opened at a preset pressure.

The seal gaskets 183 and 187 are made of insulating materials, and include a first seal gasket 183 formed between the first electrode terminal 131 and the cap plate 181 and a second gasket 187 formed between the second electrode terminal 161 and the cap plate 181. The first and second seal gaskets 183 and 187 may seal portions between each of the first electrode terminal 131 and the second electrode terminal 161 and the cap plate 181. As such, the first and second seal gaskets 183 and 187 may prevent external moisture from penetrating into the secondary battery 100 or may prevent an electrolyte contained in the secondary battery 100 from flowing out.

The upper insulation members 184 and 186 include a first upper insulation member 184 located between the first connection plate 132 and the cap plate 181 and a second upper insulation member 186 located between the second connection plate 162 and the cap plate 181.

The first upper insulation member 184 electrically insulates the first connection plate 132 and the cap plate 181 from each other. In addition, the first upper insulation member 184 contacts the cap plate 181. Moreover, the first upper insulation member 184 may also contact the first seal gaskets 183. In such a manner, the first upper insulation member 184 electrically insulates the first connection plate 132 and the cap plate 181 from each other.

The second upper insulation member 186 may be located between the second connection plate 162 and the cap plate 181. However, a portion of the second connection plate 162 contacts the cap plate 181 to then be electrically connected.

The lower insulation members 185 and 188 include a first lower insulation member 185 formed between the first collector plate 120 and the cap plate 181 and a second lower insulation member 188 formed between the second collector plate 150 and the cap plate 181.

The first lower insulation member 185 and the second lower insulation member 188 prevent unnecessary electric shorts from occurring between each of the first collector plate 120 and the second collector plate 150 and the cap plate 181. In other words, the first lower insulation member 185 and the second lower insulation member 188 prevent electric shorts between the first collector plate 120 and the cap plate 181 and between the second collector plate 150 and the cap plate 181. In addition, the first lower insulation member 185 and the second lower insulation member 188 are also formed between each of the first electrode terminal 131 and the second electrode terminal 161 and the cap plate 181, thereby preventing unnecessary electric shorts between each of the first electrode terminal 131 and the second electrode terminal 161 and the cap plate 181.

The inversion plate 189 is positioned in the short-circuit opening 181b of the cap plate 181 and is covered by the first connection plate 132. In one embodiment, the inversion plate 189 includes a downwardly convex round portion and an edge portion fixed to the cap plate 181. The inversion plate 189 and the cap plate 181 have the same polarity. In one embodiment, the inversion plate 189 is inverted to then upwardly convexly protrude when the internal pressure of the secondary battery 100 exceeds a preset pressure (e.g., a first pressure) due to overcharge.

In other words, when the internal pressure of the secondary battery 100 exceeds the preset pressure (e.g., the first pressure) due to overcharge, the first connection plate 132 contacts the upwardly convexly protruding inversion plate 189, causing a short circuit, and short-circuit current may flow from the first electrode plate 111 to the second electrode plate 112 through the cap plate 181.

Referring to FIGS. 1 to 4, each of the injection opening 191 and the exhaustion opening 192 may be formed to extend through the top and bottom surfaces of the cap plate 181. In addition, closing plugs 193 and 194 are installed in the injection opening 191 and the exhaustion opening 192, respectively. In one embodiment, each of the injection opening 191 and the exhaustion opening 192 are shaped of a circle and may have various shapes, including prismatic shapes and the like, but aspects of the present invention are not limited thereto.

As illustrated in FIG. 3, in the secondary battery 100 according to an embodiment of the present invention, a winding axis C of the electrode assembly 110 is parallel with a lengthwise direction of the cap plate 181. In other words, the injection opening 191 and the exhaustion opening 192 are formed to be perpendicular to the direction of the winding axis C of the electrode assembly 110. Accordingly, when an electrolyte is injected into the injection opening 191, the electrolyte starts to be incorporated within the electrode assembly from the first electrode plate 111, the second electrode plate 112 and the separator 113 located closer to the bottom surface of the case 170 to the first electrode plate 111, the second electrode plate 112 and the separator 113 located closer to the top portion of the case 170, and gases in the internal space of the case 170 and surplus electrolyte left after filling the inside of the case 170 are discharged through the exhaustion opening 192. In one embodiment, an injection pipe (not shown) and an exhaustion pipe may be connected to the injection opening 191 and the exhaustion opening 192, and the injection pipe and the exhaustion pipe may be connected to each other to form an electrolyte circulation flow F. As the result, a negligibly small amount of a second pressure, which is smaller than the first pressure, may be generated in the case 170. Therefore, the secondary battery 100 according to an embodiment of the present invention can improve an electrolyte injection speed and can prevent the internal pressure of the case 170 from increasing, it is possible to prevent the inversion plate 189 from operating when the electrolyte is injected.

In addition, the injection opening 191 may be larger than or equal to the exhaustion opening 192, thereby easily controlling the electrolyte injection speed.

Referring to FIG. 4, a membrane 195 allowing only gas-phase materials to pass through the same may be installed in the exhaustion opening 192. Accordingly, when the electrolyte is injected through the injection opening 191, only the gases in the internal space of the case 170 can be exhausted to the outside of the case 170.

Next, a secondary battery according to another embodiment of the present invention will be described with reference to FIG. 5.

Figure 5:
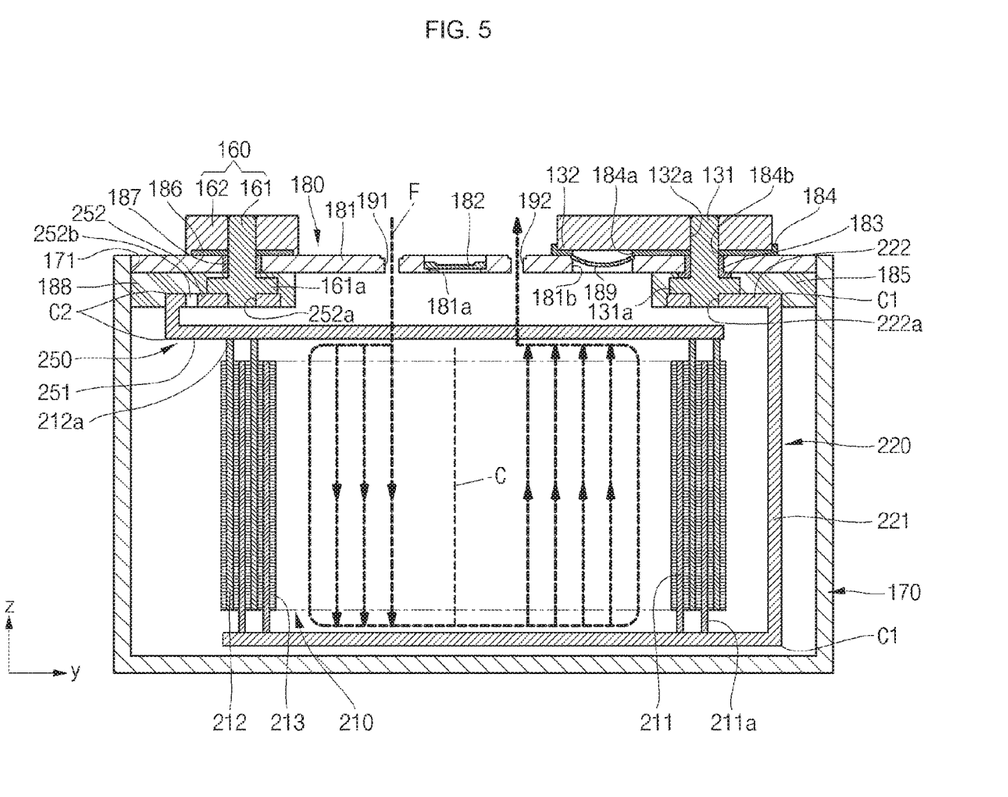
FIG. 5 is a cross-sectional view illustrating an electrolyte injection path in a secondary battery according to another embodiment of the present invention.

FIG. 5 is a cross-sectional view illustrating an electrolyte injection path in a secondary battery according to another embodiment of the present invention.

Referring to FIG. 5 with FIG. 3 for comparison, the secondary battery according to the present embodiment is different from the secondary battery 100 according to the previous embodiment in view of configurations of an electrode assembly 210, a first collector plate 220 and a second collector plate 250. Therefore, the following description will focus on the electrode assembly 210, the first collector plate 220 and the second collector plate 250. In this description, the same or substantially the same functional elements as those in the secondary battery 100 according to the previous embodiment are denoted by the same reference numerals and detailed descriptions thereof will not be given.

A winding axis C of the electrode assembly 210 extends perpendicular to a lengthwise direction the cap plate 181. Therefore, a first electrode connecting portion 221 of a first electrode plate 211 of the electrode assembly 210 is bent to have a corner C1 to be electrically connected to a first electrode uncoated region 211a of the first electrode plate 211 of the electrode assembly 210. In other words, the first collector plate 220 may be formed in a substantially 'U' shape. In addition, a second electrode connecting portion 251 of a second electrode plate 251 of a second collector plate 250 is bent to have a corner C2 to be electrically connected to a second electrode uncoated region 212a of the second electrode plate 251 of the electrode assembly 210. In other words, the second collector plate 250 may be formed in a substantially 'U' shape.

As shown, an injection opening 191 and an exhaustion opening 192 are formed in the cap plate 181 to be parallel with the winding axis C of the electrode assembly 110. Accordingly, when an electrolyte is injected into the injection opening 191, the electrolyte is downwardly incorporated into regions between each of the first electrode plate 211, a separator 213 and the second electrode plate 212, and gases in the internal space of the case 170 and surplus electrolyte left after filling the inside of the case 170 are discharged through the exhaustion opening 192. In one embodiment, an injection pipe and an exhaustion pipe may be connected to the injection opening 191 and the exhaustion opening 192 from an exterior side of the cap plate 181, and the injection pipe and the exhaustion pipe may be connected to each other to form an electrolyte circulation flow F. As the result, a negligibly small amount of a second pressure, which is smaller than the first pressure, may be generated in the case 170. Therefore, the secondary battery according to the present embodiment can improve an electrolyte injection speed and can prevent the internal pressure of the case 170 from increasing, it is possible to prevent an inversion plate 189 from operating when the electrolyte is injected.

In addition, the injection opening 191 may larger than or equal to the exhaustion opening 192, thereby easily controlling the electrolyte injection speed.

In one embodiment, a membrane allowing only gas-phase materials to pass through the same may be installed in the exhaustion opening 192. Accordingly, when the electrolyte is injected through the injection opening 191, only the gases in the internal space of the case 170 can be exhausted to the outside of the case 170.

Figure 6:
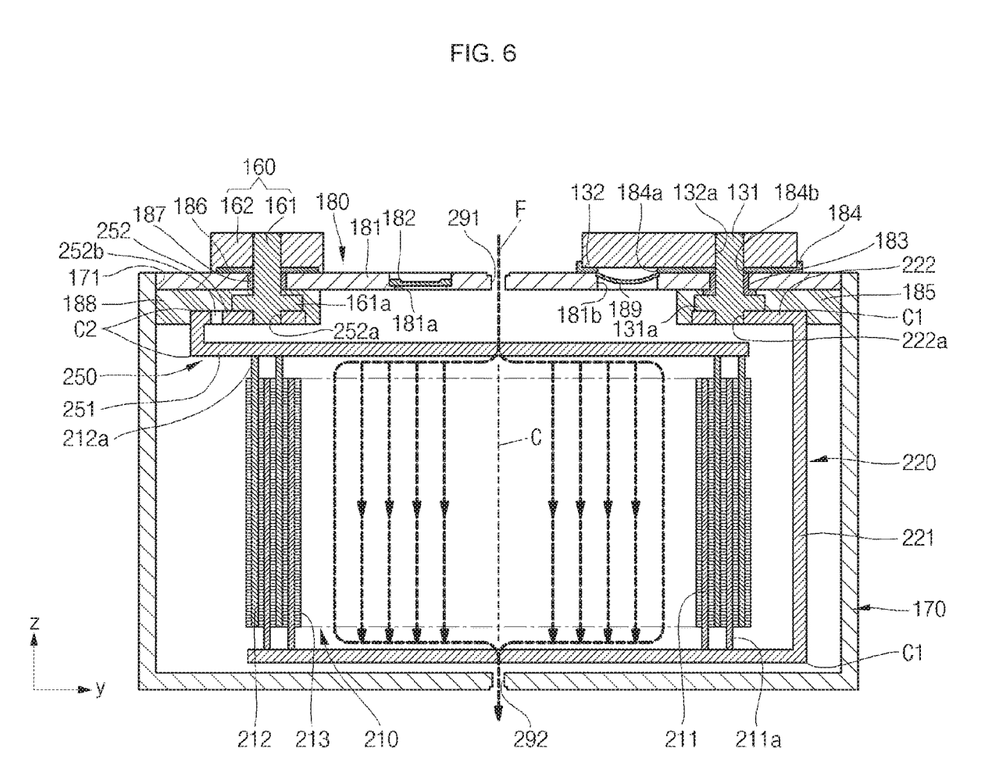
FIG. 6 is a cross-sectional view illustrating an electrolyte injection path in a secondary battery according to still another embodiment of the present invention.

FIG. 6 is a cross-sectional view illustrating an electrolyte injection path in a secondary battery according to still another embodiment of the present invention.

Referring to FIG. 6 with FIG. 5 for comparison, the secondary battery according to the present embodiment is different from the secondary battery according to the previous embodiment shown in FIG. 5, in view of configurations of an injection opening 291 and an exhaustion opening 292. Therefore, the following description will focus on the injection opening 291 and the exhaustion opening 292. In the secondary battery according to still another embodiment of the present invention, the same or substantially the same functional elements as those in the secondary battery shown in FIG. 5 are denoted by the same reference numerals and detailed descriptions thereof will not be given.

The injection opening 291 may be formed to extend through top and bottom surfaces of the cap plate 181 and may be formed substantially to correspond to a winding axis C of an electrode assembly 210. In addition, the exhaustion opening 292 is formed at one side of a case 170 to extend through the case 170. In other words, the exhaustion opening 292 is formed on a bottom surface of the case 170 substantially to correspond to the winding axis C of the electrode assembly 210.

As shown, the injection opening 291 and the exhaustion opening 292 are formed to be parallel with the winding axis C of the electrode assembly 110. Accordingly, when an electrolyte is injected into the injection opening 291, the electrolyte is downwardly incorporated into regions between each of a first electrode plate 211, a separator 213 and a second electrode plate 212, and gases in the internal space of the case 170 and surplus electrolyte left after filling the inside of the case 170 are slowly discharged through the exhaustion opening 292. In one embodiment, an injection pipe and an exhaustion pipe may be connected to the injection opening 291 and the exhaustion opening 292 from exterior sides of the cap plate 181 and the case 170, and the injection pipe and the exhaustion pipe may be connected to each other to form an electrolyte circulation flow F. As the result, a negligibly small amount of a second pressure, which is smaller than the first pressure, may be generated in the case 170. Therefore, the secondary battery according to the present embodiment can improve an electrolyte injection speed and can prevent the internal pressure of the case 170 from increasing, it is possible to prevent an inversion plate 189 from operating when the electrolyte is injected.

In addition, the injection opening 291 may have a size larger than or equal to that of the exhaustion opening 292, thereby easily controlling the electrolyte injection speed.

In one embodiment, a membrane allowing only gas-phase materials to pass through the same may be installed in the exhaustion opening 292. Accordingly, when the electrolyte is injected through the injection opening 291, only the gases in the internal space of the case 170 can be exhausted to the outside of the case 170.

While the secondary battery of the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A secondary battery comprising:
   an electrode assembly comprising a negative electrode plate, a positive electrode plate, and a separator wound together and defining a winding axis;
   a case accommodating the electrode assembly;
   a cap plate sealing the case and extending in a length direction of the cap plate;
   an injection opening in the cap plate;
   an exhaustion opening in the cap plate and being spaced from the injection opening; and
   a vent opening in the cap plate and being spaced from the injection opening and the exhaustion opening,
   wherein the injection opening is spaced apart from the exhaustion opening in the length direction of the cap plate, and the winding axis of the electrode assembly extends perpendicular to the length direction of the cap plate,
   wherein the injection opening is no smaller than the exhaustion opening and is located at a side of the cap plate that is opposite the exhaustion opening with the vent opening therebetween in the length direction of the cap plate.

2. The secondary battery of claim 1, wherein the exhaustion opening has a membrane formed therein.

3. The secondary battery of claim 2, wherein the membrane is configured to allow only a gas-phase material to pass therethrough.

4. The secondary battery of claim 1, wherein when an electrolyte is injected into the case through the injection opening, a second pressure is generated in the case and wherein the second pressure is lower than a first pressure, an inversion plate of the secondary battery being configured to invert to generate a short circuit when an internal pressure of the case exceeds the first pressure.

5. The secondary battery of claim 1, further comprising a safety vent in the vent opening, the safety vent comprising a notch configured to be opened at a certain pressure.

* * * * *